Aug. 17, 1965 J. P. HARRIS 3,201,038

DATA REGISTERING DEVICE

Original Filed Aug. 21, 1962 4 Sheets-Sheet 1

INVENTOR.
JOSEPH P. HARRIS

BY

Gordon Wood

ATTORNEY

Aug. 17, 1965 J. P. HARRIS 3,201,038

DATA REGISTERING DEVICE

Original Filed Aug. 21, 1962 4 Sheets-Sheet 2

INVENTOR.
JOSEPH P. HARRIS

BY Gordon Wood.

ATTORNEY

Aug. 17, 1965 J. P. HARRIS 3,201,038

DATA REGISTERING DEVICE

Original Filed Aug. 21, 1962

4 Sheets-Sheet 3

INVENTOR.
JOSEPH P. HARRIS

BY Gordon Wood

ATTORNEY

Aug. 17, 1965 J. P. HARRIS 3,201,038

DATA REGISTERING DEVICE

Original Filed Aug. 21, 1962 4 Sheets-Sheet 4

INVENTOR.
JOSEPH P. HARRIS
BY
Gordon Wood.
ATTORNEY 3,201,038
DATA REGISTERING DEVICE
Joseph P. Harris, 15 Terrace Walk, Berkeley 7, Calif.
Continuation of application Ser. No. 218,420, Aug. 21, 1962. This application Nov. 13, 1962, Ser. No. 236,931
22 Claims. (Cl. 235—50)

This application is a continuation of application Serial No. 218,420, filed August 21, 1962, now abandoned.

This invention relates to devices for the manual registering of data on machine-processable record cards. More particularly, it relates to a device for bringing a legible statement of what data is sought or supplied into close proximity with the associated index-point areas on a record card.

One of the primary disadvantages of standard types of record cards is that having been designed primarily for convenient machine processing, they are too small to provide more than a minimal amount of space for printed or written matter. When these cards are used manually, either for registering data or reading of already-recorded data, this disadvantage becomes particularly evident, and hence for such uses as voting, census or survey questionnaires, or examinations, record cards have tended to be much less popular than their potentialities would otherwise encourage.

The only solution heretofore proposed has been to magnify the card so that a moderate amount of very small printing could be enlarged enough to become legible. However, in such systems, the magnifying glass interposed between the record card and the user inevitably constitutes a barrier to manual punching or marking of the card. Consequently, a complicated mechanical or electrical system becomes necessary for both guiding and activating the punching or marking element with the result that the entire procedure ceases to be manual at all, but becomes instead, an operation involving a comparatively large, heavy and expensive piece of equipment.

The primary object of the invention is therefore to provide a small, light and inexpensive device adapted to bring descriptive matter into close proximity with selected index-point areas of a record card in a readily legible form. A further object is to do this in such a simple way that any voter or questionnaire answerer can operate the device, and thus open extensive possiblities for facilitating and accelerating the work of elections and surveys.

Other objects and advantages of the invention will be made apparent in the following specification and in the drawings, in which.

Figure 1:
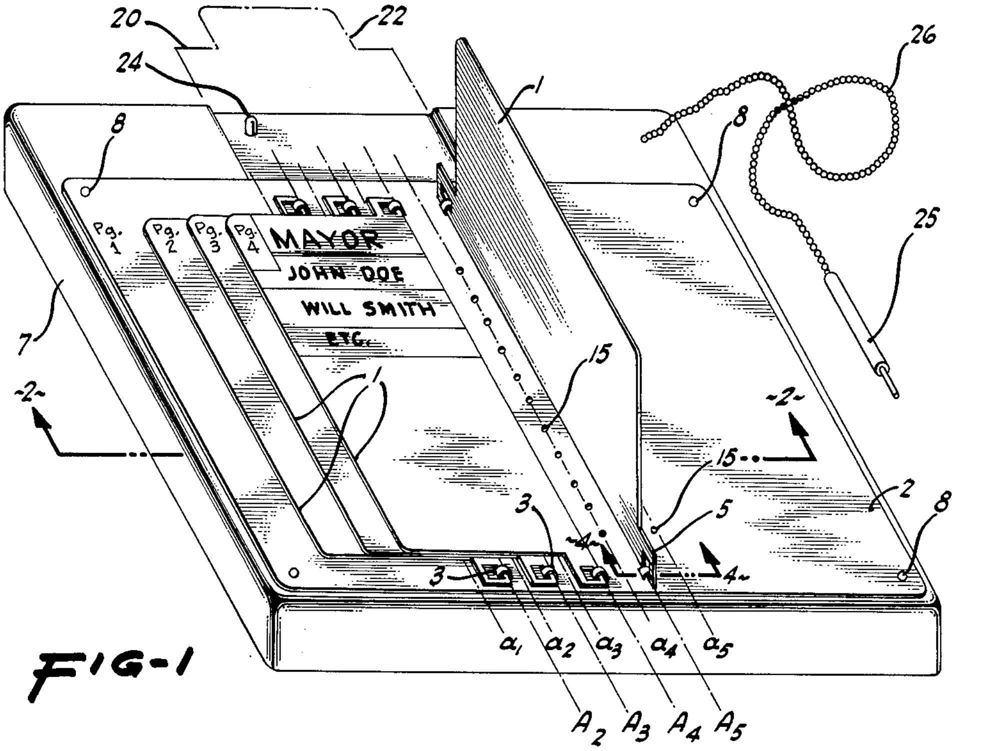
FIG. 1 is a perspective of a voter's card punch embodying the invention.

In detail, and referring to FIGS. 1 through 6, several hinged leaves 1 are pivotally mounted on a template sheet 2 by means of plastic strip rings 3 (FIG. 4) passed through rectangular slots 4 in ears 5 at each end of leaves 1 and also passed through pairs of parallel slots 6 in the template sheet 2. By means of clasps 8 the template 2 is secured to a base 7, in the center of whch is a rectangular opening into which is fitted a card guide 9 (FIG. 2) and a metal die plate 10 having a plurality of holes 11. On the upper side of die plate 10 is a rubber backing sheet 12 having slits 13. Underneath the die plate 10 is a catch basket 14. Holes 11 in die plate 10 and slits 13 in backing sheet 12 are in register with holes 15 in the template 2.

Figures 6, 7, 8, 9, 10, 11, 12:
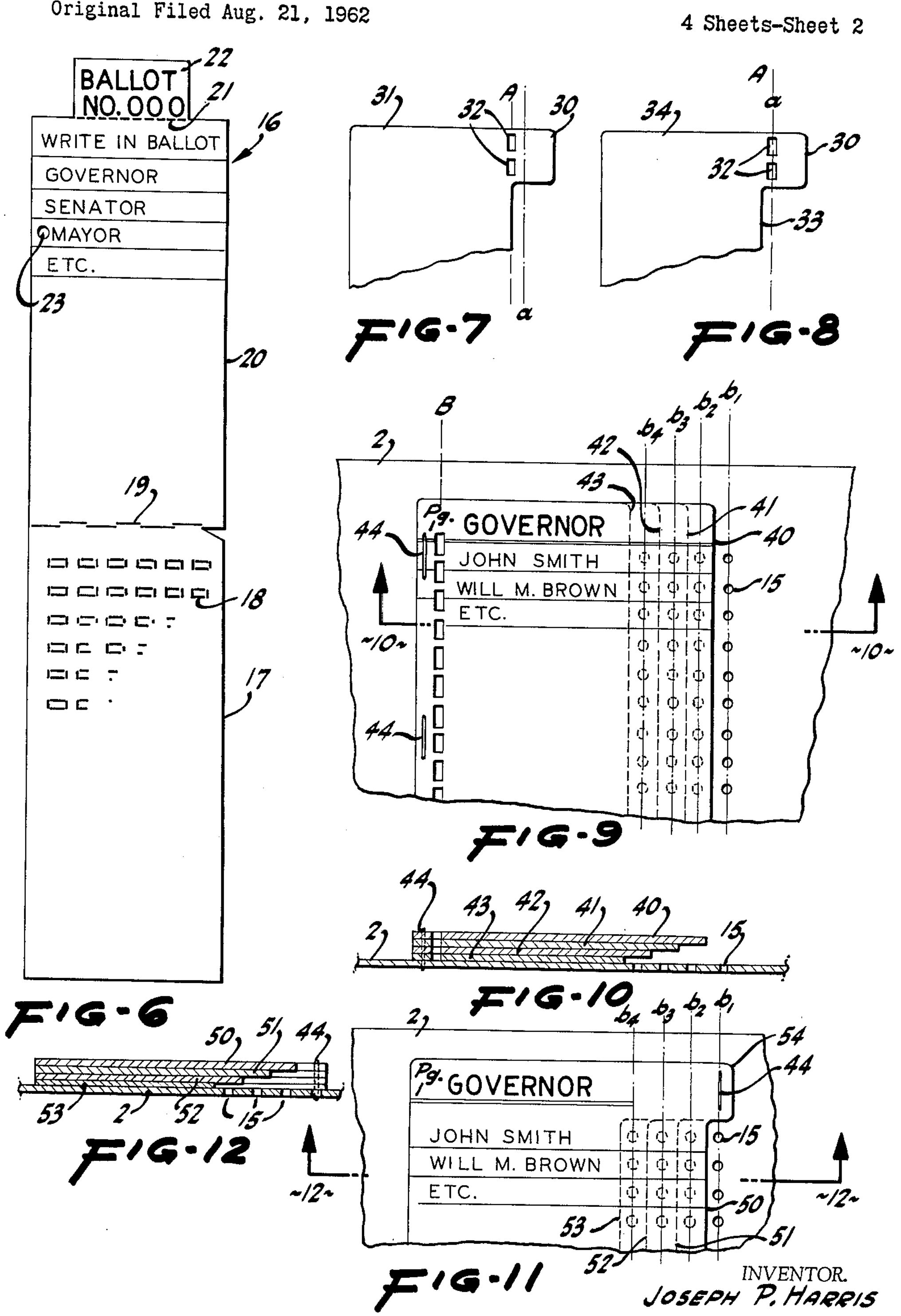
FIG. 6 is a side elevation of a combined record card and write-in ballot suitable for use with the device of FIG. 1.
FIGS. 7 and 8 are side elevations of the top portions of two modified forms of the leaf of FIG. 3.
FIG. 9 is a side elevation of a modified form of leaf for the device of FIG. 1.
FIG. 10 is a cross section in a plane indicated by lines 10—10 of FIG. 9.
FIG. 11 is a side elevation of another modified form of leaf for the device of FIG. 1.
FIG. 12 is a cross section in a plane indicated by lines 12—12 of FIG. 11.

Inserted from the top between the card guide 9 and the rubber backing sheet 12 is an elongated ballot card assembly 16 (FIG. 6). The lower portion of the ballot card 16 is a standard record card 17 having a plurality of preperforated index-point areas 18, and this record card 17 is connected by a row of perforations 19 to a write-in ballot 20, which in turn is connected by a row of perforations 21 to a stub 22. A hole 23 in the write-in ballot 20 fits over a locating pin 24 (FIG. 1) near the top of the base 7 in order to position the record card 17 with respect to the template 2 in such a way that the index-point areas 18 in the record card are in register with the holes 15 in the template 2.

When the ballot card 16 is thus located, a stylus 25 attached to the base 7 by means of a bead-chain 26 may be utilized to punch the record card 17 in the following manner: The point 28 of the stylus 25, consisting of a steel pin 27 encased in a rubber coating 29, is inserted through a desired hole 15 in the template 2, until it engages a scored index point area or "chip" 18 and separates it from the remainder of the record card 19 by pushing it downward through the slit 13 in the rubber backing 12, through the hole 11 in the die plate 10, and finally into the catch basket 14.

Clean removal of the "chips" 18 from the record card 17 may be occomplished by two methods, one being a mechanical dislodgement of the "chip" from the rubber backing by means of a shoulder on the stylus (see U.S. Patent No. 3,007,620). However, this has the dlisadvantage that it involves a stylus construction that causes considerable wear and tear of both template and rubber backing. The system disclosed in FIGS. 2 and 5 eliminates this wear problem by employing frictional drag of the stylus point 28 on the "chip." This is enhanced by making the stylus point of a material having a high coefficient of friction relative to paper or paperlike materials, as is the case with buna or gum rubber and white or cloth finish neoprene. These rubber coatings may be either bonded onto the stylus pin 27 or may be premolded and held in place by snapping over the pin's head 27'. The effectiveness of this type of stylus can also be greatly improved by making the rubber backing 12 of a low friction elastomer, such as silicone rubber or neoprene sprayed with a liquid dispersion of tetrafluoroethylene (Teflon).

As the index point areas 18 in standard record cards 17 are arranged in rows, and the holes 15 in the template 2 are in register with them, it is evident that the holes 15 will also be in rows ($a_1, a_2, a_3, a_4, a_5$), and the edges of the associated leaves 1 will be adjacent to these rows, except for the first and last pages which may, if desired, be printed directly on the template 2. The turning axes of the leaves 1 are designated in various figures as A, B, C, D, and E with appropriate subscripts. In the case of the leaves of FIGS. 1, 2 and 3, the turning axes $A_2, A_3, A_4$, and $A_5$ coincide with the edges of those leaves given page numbers 2, 3, 4, and 5, respectively, and in order to successively expose the rows of holes 15 lying on lines $a_1, a_2, a_3, a_4$, and $a_5$ axes $A_2, A_3, A_4, A_5$ must be in between lines $a_1, a_2, a_3, a_4$, and $a_5$, respectively.

In the modified form of FIG. 7 ears 30 are provided at the top and bottom of each leaf 31 and adapted to be stapled directly to the template 2 instead of mounted on ring hinges 3. An equivalent hinge effect may be produced by weakening the ears 30 by means of slots 32 cut along the desired hinge axis A. The line "*a*" indicates the position of the holes 15 in the template 2 with respect to this type of leaf.

In the modification of FIG. 8, the construction is similar to that of FIG. 7 except that the edge 33 of the leaf 34 is slightly inwardly of the hinge axis A. If a leaf of this type is stapled by its ears 30 to the template 2 in such a way that the turning axis A coincides with line "*a*" of holes 15, its edge 33 will lie adjacent to that line both before and after turning, first on one side of the holes 15 then on the other. The primary advantage of this type of leaf mounting is that if the space required for legible printing of candidates' names (or the equivalent thereof in other applications) exceeds the spacing of adjacent index point areas 18, then some of these areas must be omitted. With the mounting of FIG. 8, however, it is possible to recover the use of some or all of such unused areas 18 by also printing on the backs of the leaves 1 and locating such printing slightly offset from the printing on the front of the leaf 1. A similar effect can be achieved with the ring mounting of FIG. 1 if the rectangular holes 4 in the leaves 1 are moved closer to the right edge of the leaf 1, and the ring axis A is mounted to coincide with the centerline of the associated row of index point areas "*a*."

Figure 16:
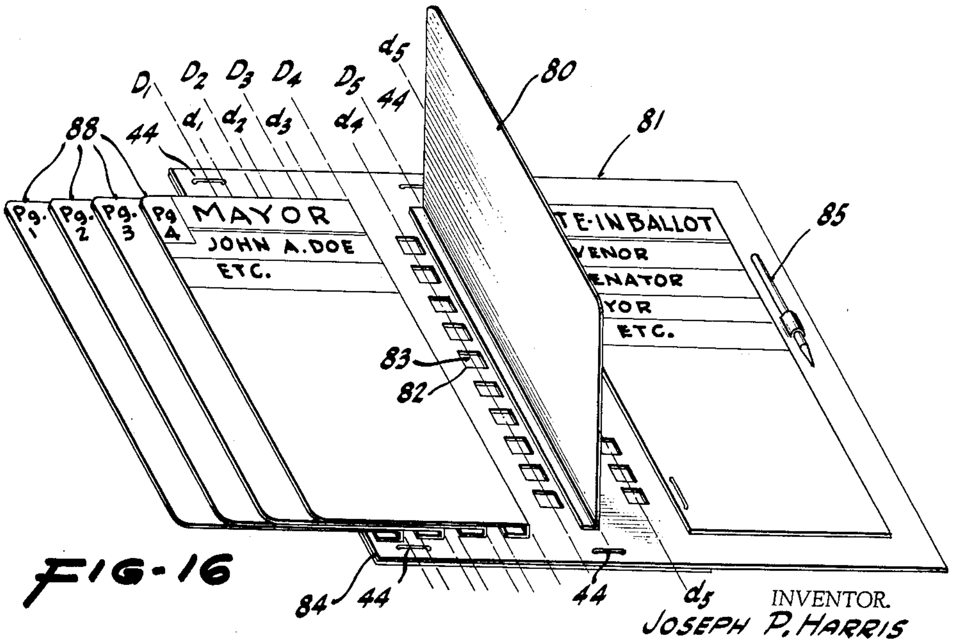
FIG. 16 is a perspective of a modified form of the invention as applied to an absentee ballot, in which the registering of data on the record card is by mark rather than punch.
Figures 17, 18:
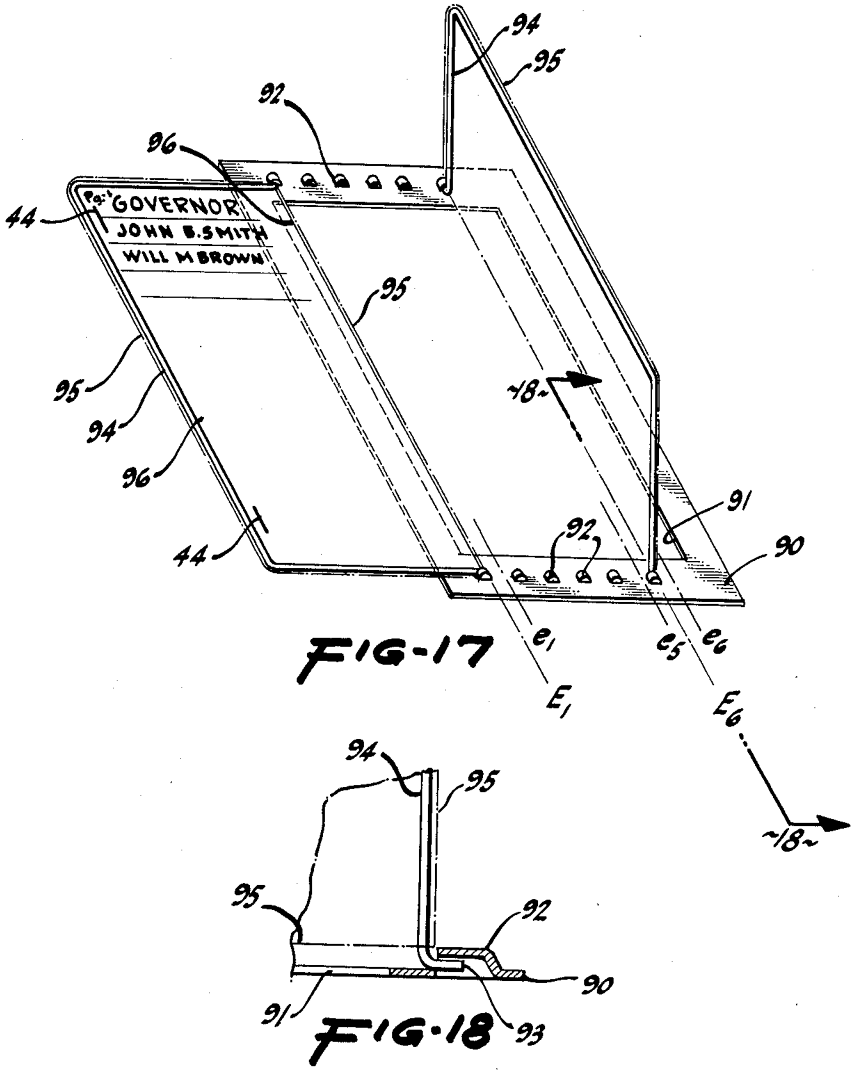
FIG. 17 is a perspective view of another modified form of the invention incorporating elements suitable for use with existing portable punch dies or mark sensing record card holders.
FIG. 18 is a cross section through the device of FIG. 17 showing the hinge portion thereof.

In FIGS. 9, 10, four leaves 40, 41, 42, and 43, each one narrower than the one above it, are shown attached by staples 44 to the template 2 so as to turn about a common hinge axis B. In this arrangement the punching of the successive rows of holes 15 in lines $b_1, b_2, b_3$ and $b_4$, proceeds from right to left. Like that of FIGS. 11, 13, and 15 the configuration is less expensive to manufacture than arrangements as shown in FIGS. 1, 16 and 17 but does not share with these latter arrangements the advantage of exposing only one row of index point areas 18 at a time.

FIGS. 11, 12 show a similar arrangement to that of FIGS. 9, 10, but with the reference edges of the leaves 50, 51, 52 and 53 adjacent to the holes 15 being on the hinged side of the leaves. In order to successively expose the rows $b_1, b_2, b_3$, and $b_4$ of holes 15, the edges 50, 51, 52, and 53 of the leaves between the ears 54 must be cut back from the hinge axis B a little further on each successive page.

Figures 13, 14, 15:
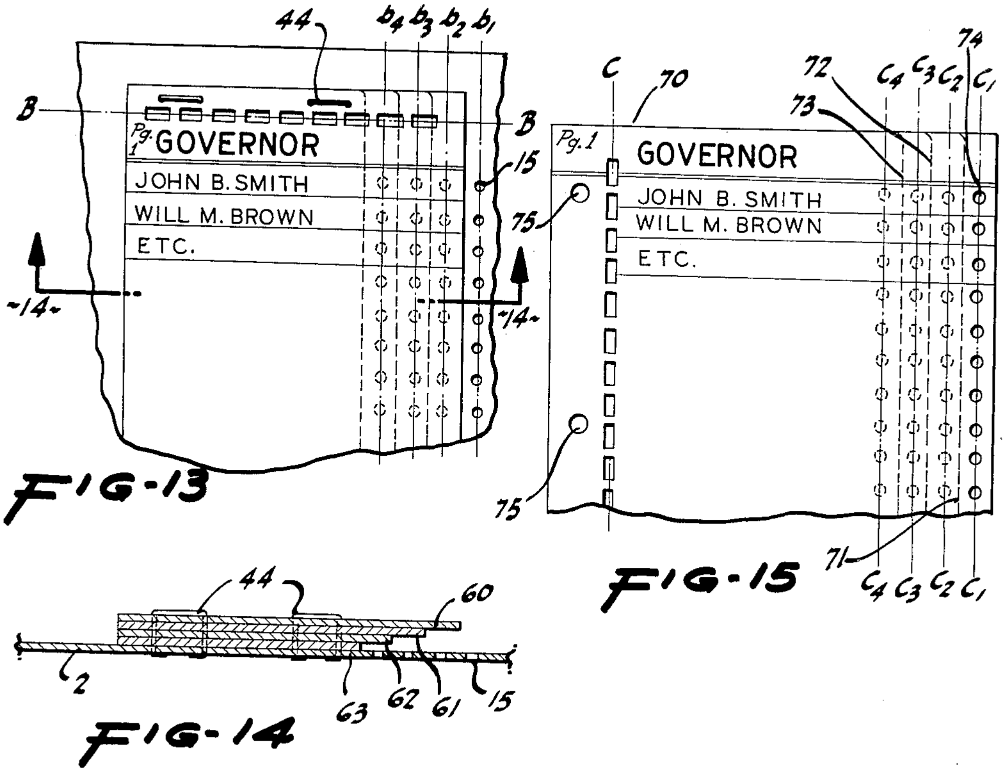
FIG. 13 is a side elevation of still another modified form of leaf for the device of FIG. 1.
FIG. 14 is a cross section in a plane indicated by lines 14—14 of FIG. 13.
FIG. 15 is a side elevation of a series of leaves suitable for a device such as shown in FIG. 1 but in which the separate template or punch guide sheet has been eliminated.

The mounting of FIGS. 13, 14 is similar to that of FIGS. 9, 10, except that the hinge axis B is along the top instead of at the side, but as before the edge of each successive leaf 60, 61, 62 and 63 adjacent to the rows $b_1, b_2, b_3$ and $b_4$ of holes 15 is cut back slightly more than the page above, by the distance between adjacent rows of holes 15.

The leaves of FIG. 15 are similar to those of FIGS. 9, 10 in that each successive leaf 70, 71, 72, 73 is narrower than the one on top of it. However, in this construction, each leaf serves as its own template by containing its own row $c_1, c_2, c_3$ and $c_4$ of holes 74. The template 2 is therefore unnecessary and the leaves may be directly attached to the base 7 (FIGS. 1, 2) by means of clasps such as indicated at 8 in FIG. 1, passed through common holes 75 at the left of the common hinge axic C.

Figure 2:
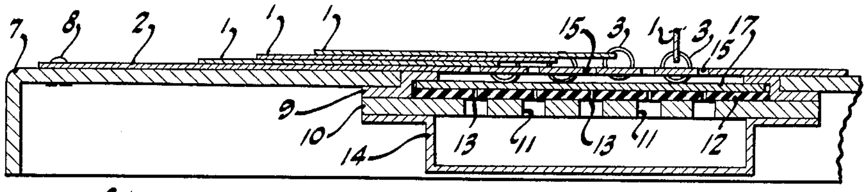
FIG. 2 is a section in a plane indicated by lines 2—2 of FIG. 1.
Figure 3:
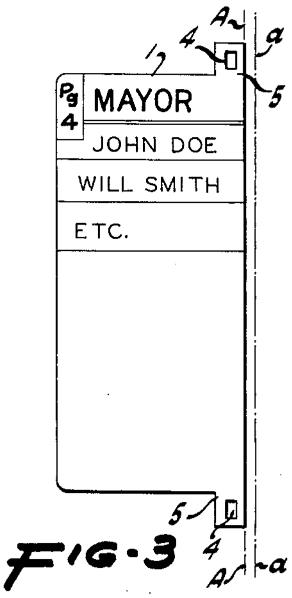
FIG. 3 is an elevation of a leaf of the type used in the device of FIG. 1.
Figure 4:
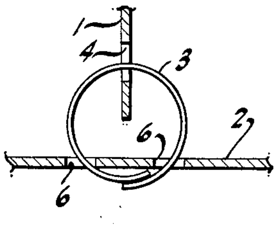
FIG. 4 is an enlarged sectional view through the device of FIG. 1 showing the plastic ring hinge employed to mount the leaves.

The absentee ballot shown in FIG. 16 is designed for one-time use, so it utilizes a series of leaves 80 analogous to those of FIGS. 1, 2, 3, but for the sake of economy no base is employed. Instead paper leaves 80 are pasted directly to a heavy paper template 81 which has square holes 82 cut in it directly above the index point areas 83 of a record card 84 which is attached to the underside of the paper template 81 by means of staples 44. In this case the record card 84 is of the mark sensing type, and hence there is supplied a pencil 85 having magnetic or other type lead suitable for use with the particular mark sensing card 84 employed. As in FIGS. 1, 2, 3, the hinge axes $D_1, D_2, D_3, D_4, D_5$ of the leaves 80 lie in between the lines $d_1, d_2, d_3, d_4, d_5$ of square holes 82 in the template 81 and the index point areas 83 which are in register with them.

In FIGS. 17, 18, a thin rectangular metal or sheet plastic base 90 with a large rectangular opening 91 in its center contains a series of raised slitted openings 92 at each end. Into opposite pairs of these openings 92 is snapped the bent-over ends 93 of a C-shaped spring steel wire frame 94, and over the frame 94 is fitted a transparent sheet plastic envelope 95. For clarity only two such assemblies of wire frame 94 and envelope 95 are shown. The first of these is also shown with a printed page 96 inserted into the plastic envelope 95, which may be done from its open side adjacent to the hinge axis $E_1$. If desired the page 96 may be fixed with respect to the wire frame 94 and envelope 96 by staples 44 near the outer edge of the page 96. Leaves so assembled may be snapped into or out of the base sheet 90 before or after it has been slipped into the die above the template, shown in the device of FIG. 1 of U.S. Patent No. 3,007,620 to Laframboise (said die and template being parts numbered 16 and 32 respectively in that patent.)

It may be observed that the device of FIG. 1 is particularly adapted to elections in which a voting booth is used. The procedure would be as follows: After being handed his ballot card 16 (FIG. 6) by the precinct official, the voter steps into a booth where the device of FIG. 1 is mounted, inserts his card into the device, punches out his selected votes for candidates and measures with the aid of the stylus 25, removes his ballot card 16, records any write-in candidates, folds the write-in portion 20 of the ballot card 16 down over the record card 17 to conceal the punchouts 18, and hands it back to the precinct official, who tears off the stub 22 and gives it to the voter and deposits the folded ballot card 16 in the ballot box. At the end of the day, the precinct officials open the ballot box and separate the write-in ballots 20 from the record cards 17, checking to make sure that any write-ins are not in conflict with punchout votes for the same office. The write-in votes are then tabulated in the precinct while the record cards 17 are being transported to the election headquarters and processed through a computer. Under this procedure, official election results may be obtained in a fraction of the time now taken for manual counting.

As the same assembly of leaves 1 and template 2 is used for an entire election, serving several hundred voters in a precinct, and only the ballot card 16 is individual the printing cost for elections is reduced. Also, since the vote counting is carried out not by expensive hand labor or complicated machines located in the precinct, the cost of counting is greatly reduced. This is especially the case when a comparison is made with the cost of conventional voting machines, which are subject to expensive storage and servicing costs, must be transported to and from the precincts at each election, and have a very high initial cost that must be amortized over only one or two elections a year. The computers used to tabulate record cards, on the other hand, are used for other purposes all year long between elections, and the charge for processing a set of election returns is therefore relatively small.

While the invention has been particularly shown and described with reference to five primary embodiments (FIGS. 1, 9, 15, 16 and 17) and modifications thereof, it will be appreciated that various changes in form and detail and in recombination of novel features may be made by one skilled in the art, without departing from the spirit and scope of the invention.

For example, in FIG. 1, the leaves 1 could be attached to the base 7 or the card guide 9 instead of the template 2, in which case the template 2 would be made shorter, and possibly also narrower if it is desired to place it under the card guide 9 rather than clip it to the base 7. Alternatively the leaves 1 could be attached to the template 2 as shown, but the latter could be narrower in the fashion shown in U.S. Patent No. 3,007,620 or 3,015,424. If desired this narrower template 2 could be located under the card guide 9.

It will also be evident that a leaf 1 such as shown in FIG. 3 may be strengthened if necessary by making it paper coated, laminated or encased in plastic, or by making it entirely of any sheet plastic, such as polystyrene, suitable to be printed upon. Alternatively the ears 5 may be strengthened by making the hole 4 round and reinforcing it with a tubular rivet; in this case the ring hinge 3 should be made of wire rather than plastic or metal strip stock.

Figure 5:
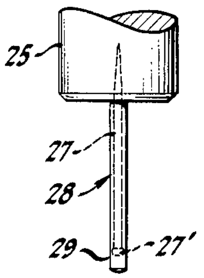
FIG. 5 is an enlarged side elevation of the end of one type of stylus suitable for use with the device of FIG. 1.

The high-friction characteristics of the stylus point 28 could also be obtained in a number of ways other than shown in FIG. 5. For example, a plain, thin cylindrical steel point will have a higher coefficient of friction relative to paper than the low-friction elastomers mentioned above, provided the surface of the steel is roughened by knurling, fine threading or shallow grooves such as result from coarse machining operations.

An obvious alternative to the arrangement of the ballot card 16 shown in FIG. 6 is to connect the write-in ballot to the record card 17 at the side rather than the end. It is also possible to provide a reasonable amount of space for write-ins between lines of index point areas 18 on the record card 17, if it is desired to shorten or eliminate the write-in portion 20 of the ballot card 16.

In arrangements such as shown in FIGS. 9, 11, 13 and 15, in which the several leaves 1 have a common hinge axis (B, C) the staples 44 or holes 75 (FIG. 15) shown may obviously be replaced by any spiral wire, plastic roll, stitching glue or any other type of binding used on books, notebooks, plain or looseleaf, brochures or the like. Similarly, leaves such as shown in FIGS. 3, 7, 8, 16 or plain rectangular leaves, may be mounted to the template 2 with standard transparent plastic roll tape, for applications where a long service life is not essential.

In FIG. 15 it will be apparent that the holes 15 in the leaves 70, 71, 72, 73 may have shapes other than round, and may be large or small depending on whether the data registering is to be by mark or punchout; it will also be evident that the location of these guide holes 74 in the leaves would serve to obviate the need for the template 2 in the other configuration shown as well. The advantages of this, however, will in most cases be outweighed by the fact that such an arrangement imposes more severe requirements for precise location and firm mounting of the leaves, and in the case of FIGS. 1, 16, and 17 would sacrifice the important advantage of exposing only one row of index-point areas 18 at a time.

Regarding FIG. 16, if staple holes left in the record card 84 when it is removed from template sheet 81 cause difficulties in obtaining accurate machine tabulation, detachable stubs similar to that shown at 22 in FIG. 6 may be added at the ends of record card 84 to take the staples, or, alternatively, the record card 84 may be encased in an envelope of which the perforated paper template sheet 81 of FIG. 16 is simply the top side. Also, large holes 82 of the type shown in the template 81 could replace the small holes 15 in the templates 2 shown in FIGS. 1, 9, 11, 13 and 15 in any device where mark sensing record cards 84 are to be used in preference to preperforated record cards 17. The use of mark sensing record cards 84 in the device of FIG. 1 would obviously eliminate the need for parts 11, 12, 13 and 14 in that embodiment (see FIG. 2). Similarly individual leaves 80 such as shown in FIG. 16 or a collation of leaves such as shown in FIGS. 9, 11, 13 or 15 may be mounted directly onto a mark sensing record card 84 by passing one or more simple clasps 8 (FIGS. 1, 2) through holes made by punching out unused index point areas 18.

Another obvious modification within the spirit of the invention would be to utilize leaves similar to those shown in FIG. 17 having a frame 94 adapted to receive an insert page 96, pivotally mounted directly on the base 7 or template 2 of FIG. 1, or to provide frames of similar construction but varying width to house the leaves of one of the common axis configurations shown in FIGS. 9, 11, 13 or 15. And one skilled in the art will also readily note that leaves such as those of FIGS. 9, 11, 13 or 15 may be mounted so as to progressively expose rows of index-point areas 18 by means other than the disclosed hinges parallel to the plane of the record card. For example, the leaves may be mounted on a single pin or rivet at one corner so they lie always in planes parallel to and slightly above the plane of the record card 17, and thus swing about a common axis perpendicular to themselves. Or the leaves may be mounted in individual sets of grooves so that the voter slides them back one at a time, either sidewise or lengthwise depending on where the grooves are located. Similarly, a single elongated page to tape of varying width (or varying lateral hole position if template holes are provided within the page or tape) may be passed down across the face of the card in discrete steps, to achieve the same effect as successively sliding a series of separate leaves as described. An obvious modification of such an arrangement would be to fix the elongated page or tape and slide the record card beneath it.

I claim:

1. In a data registering device for use with a machine-processable record card provided with a plurality of groups of index point areas: a base, positioning means carried by said base and positioning a record card thereon with said index point areas in a predetermined position relative to said base, a leaf provided with a row of reference indicia associated respectively with the areas in one of said groups of index point areas, means mounting said leaf on said base for movement from a position with said indicia respectively in alignment with the areas of one of said groups and in covering relation relative to another of said groups, to a position uncovering said other group.

2. A device according to claim 1 wherein a second leaf provided with a second row of reference indicia associated with said other group of index point areas on said card is positioned under said first mentioned leaf in a position with said second row in alignment with said second group when said first mentioned leaf uncovers said other group.

3. A device according to claim 2 wherein said first mentioned leaf is adapted to be moved to a position covering the areas of said one group when uncovering the areas of said second group.

4. In a data registering device for use with a machine-processable record card provided with a plurality of parallel rows of index point areas: a base, a card positioning member carried by said base and positioning a record card thereon with said index point areas in a predetermined position relative to said base, a leaf provided with a row of reference indicia associated respectively with the areas in one of said parallel rows of index point areas, means mounting said leaf on said base with said row of reference indicia parallel to said parallel rows of index point areas, said mounting means permitting swinging movement of said leaf relative to said base from a position with said indicia respectively in alignment with the areas of one of said rows of areas and in covering relation relative to another of said rows of areas, to a position uncovering said other row.

5. A device according to claim 4 wherein a second leaf provided with a second row of reference indicia associated with said other row of index point areas on said card is positioned under said first mentioned leaf in a position with said second row in alignment with said other row of areas.

6. In a device for enabling a user to manually record data on a machine-processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, and a template sheet interposed between said record card and said leaf, said template sheet containing at least one hole including one in register with said other index point area.

7. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, a template sheet interposed between said record card and said leaf, said template sheet containing at least one hole including one in register with said other index point area, said leaf being mounted on said template sheet.

8. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, said record card having frangibly connected to one of its edges a second card of a size and shape suitable to cover substantially all said index point areas when said second card is folded over said record card.

9. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, all said index point areas comprising individually scored chips of card material having frangible connections to said card, and a manually manipulatable punch for punching out said chips.

10. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, a manually manipulatable punch for punching out said index point areas, and die means supporting the material of said card adjacent to said index point areas during punching.

11. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, all said index point areas comprising individually scored chips of card material having frangible connections to said card, and a punching means incorporating a point thinner than the least width of said chips and having a surface of greater coefficient of static friction relative to the material of said card than said material has relative to smooth metal.

12. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface legible information suitable to identify the data recordable at said other index point area, all said index point areas comprising individually scored chips of card material having frangible connections to said card, and die means adapted to support the material of said card adjacent to said index point areas during punching, said die means having a lower coefficient of static friction relative to the material of said card than said material has with natural rubber.

13. In a device for enabling a user to manually record data on a machine processable record card having a plurality of index point areas: a leaf, means mounting said record card and said leaf for relative movement to a position in which said leaf covers a plurality of said index point areas and also exposes at least one other index point area, said leaf carrying on a portion of its surface information suitable to identify the data recordable at said other index point area, and said leaf also containing at least one hole, including one in register with said other index point area.

14. In a device for manually recording data: a holder adapted to be mounted above a machine processable record card of the type having a plurality of index point areas, at least one leaf pivotally mounted so as to be turnable to a position in which it covers a plurality of said index point areas and also exposes at least one other index point area, said leaf including a frame and a separately insertable page.

15. A device for guiding the manual recording of data on a recording component which comprises a base sheet having a plurality of adjacent columns of aligned apertures adapted for super-positioning relative to the recording component, said base sheet having guide information adjacent to the column of apertures located at one side of the plurality of columns, additional information guide sheet means hingeably secured to the base sheet along hinge axes between adjacent aligned aperture columns, said additional guide information sheet means having on one side thereof guide information registered adjacent to the next adjacent apertured column and having its opposite side unrelated to the aligned apertures so that when each said additional sheet means is turned about its hinge to one position adjacent to the base sheet the information carried by it is aligned with the aperture column adjacent to the hinge position and when turned to a second position adjacent to the base sheet the apertured column and guide information of the preceding sheet is masked.

16. A device for guiding the manual recording of data on a recording component which comprises a base sheet having a plurality of adjacent columns of aligned apertures adapted for super-positioning relative to the recording component, said sheet having guide information adjacent to the column of apertures located at one side of the plurality of columns, additional information guide sheet means hingably secured to the base sheet along hinge axes between adjacent aligned aperture columns, each of said additional guide information sheet means having on one side thereof guide information, registered adjacent to the apertured column and having the opposite side unrelated to the aligned apertures so that when said additional sheet means is turned about its hinge to one position adjacent to the base sheet the guide information carried by it is aligned with the aperture column adjacent to the hinge position and when turned to a second position adjacent to the base sheet the aperture column of the preceding sheet is masked, whereby the apertures are adapted to form a template for producing a selected record on the recording component.

17. In a data registering device, a base, a machine processable record card provided with a plurality of groups of index point areas, positioning means carried by said base and positioning said record card thereon with said index point areas in a predetermined position relative to said base, a leaf swingably positioned on said base and swingable from a covering position with one side thereof directed toward said card to an open position substantially 180° therefrom, said leaf being provided with reference indicia on said one side with said indicia being associated respectively with one of said groups of said index point areas.

18. A device for guiding the manual registration of data on a recording component provided with a plurality of columns of index point areas; said device comprising:

a base sheet provided with a pair of columns of identifying elements adapted to be positioned over the recording component with said pair of columns of elements in registration with a corresponding pair of columns of index point areas, a leaf provided with a column of data corresponding to one of said columns of elements, means swingably supporting said leaf on said base for swinging relative thereto about an axis parallel to and between said pair of colmuns of elements, whereby said leaf may be swung from a position with the data in said column of data aligned with corresponding elements in one of said columns of elements to a position covering said one column and uncovering the other.

19. A device according to claim 18 wherein said identifying elements are apertures.

20. In a data registering device for use with a machine processable record card provided with a plurality of groups of index point areas:

a base, positioning means carried by said base and positioning a record card thereon with said index point areas in a predetermined position relative to said base, a leaf provided with a row of reference indicia associated respectively with the areas in one of said groups of index point areas, means mounting said leaf on said base for movement from a position with said indicia respectively in alignment with the areas of one of said groups and in covering relation relative to another of said groups, to a position uncovering said other group, means for identifying for the user particular index point areas respectively associated with corresponding reference indicia.

21. A device according to claim 20 wherein said means is a template provided with apertures in registration with said index point areas.

22. A device according to claim 20 wherein said means comprises apertures in said leaf in registration with said index point areas.

References Cited by the Examiner

UNITED STATES PATENTS

| | | | |
|---|---|---|---|
| 1,109,200 | 9/14 | Chapman | 235—50 |
| 1,205,730 | 11/16 | Garbo | 283—5 |
| 1,416,792 | 5/22 | Cotter | 283—5 |
| 1,500,777 | 7/24 | Stevenson | 35—48 |
| 2,086,047 | 7/37 | Rand | 129—16 |
| 2,563,273 | 8/51 | Rathburn | 235—50 |
| 2,858,073 | 10/58 | Taube | 235—61.12 |
| 2,923,452 | 2/60 | Holovka | 225—93 |
| 3,007,620 | 11/61 | Laframboise | 225—93 |
| 3,015,424 | 1/62 | Laframboise | 225—93 |
| 3,045,905 | 7/62 | Tarasuk | 235—61.12 |

LEO SMILOW, *Primary Examiner.*

LEYLAND M. MARTIN, *Examiner.*